United States Patent
Zhang

(10) Patent No.: US 10,305,652 B2
(45) Date of Patent: *May 28, 2019

(54) METHOD AND DEVICE FOR APERIODIC SRS IN UE AND DEVICE BASE STATION

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: Shanghai Langbo Communication Technology Company Limited, Shanghai (CN)

( * ) Notice: Subject to any disclaimer, the term of this patent is extended or adjusted under 35 U.S.C. 154(b) by 214 days.

This patent is subject to a terminal disclaimer.

(21) Appl. No.: 15/129,790

(22) PCT Filed: Mar. 26, 2015

(86) PCT No.: PCT/CN2015/075076
§ 371 (c)(1),
(2) Date: Sep. 27, 2016

(87) PCT Pub. No.: WO2015/144062
PCT Pub. Date: Oct. 1, 2015

(65) Prior Publication Data
US 2017/0141893 A1   May 18, 2017

(30) Foreign Application Priority Data
Mar. 27, 2014   (CN) .......................... 2014 1 0120411

(51) Int. Cl.
*H04L 5/00*   (2006.01)
*H04L 12/24*   (2006.01)
(Continued)

(52) U.S. Cl.
CPC .......... *H04L 5/0048* (2013.01); *H04L 5/0023* (2013.01); *H04L 5/0085* (2013.01);
(Continued)

(58) Field of Classification Search
CPC . H04L 5/0048; H04L 41/0803; H04L 5/0023; H04L 5/0085; H04L 5/0094; H04L 5/0092; H04W 72/0453; H04W 72/042
See application file for complete search history.

(56) References Cited

U.S. PATENT DOCUMENTS

| | | | |
|---|---|---|---|
| 2008/0205338 A1* | 8/2008 | So ....................... | H04W 72/042 370/329 |
| 2012/0250631 A1 | 10/2012 | Hakola et al. | |

(Continued)

FOREIGN PATENT DOCUMENTS

| | | |
|---|---|---|
| CN | 101808409 A | 8/2010 |
| CN | 102577291 A | 7/2012 |

(Continued)

OTHER PUBLICATIONS

International Search Report dated Jun. 11, 2015 from International Patent Application No. PCT/CN2015/073903 filed Mar. 9, 2015.
International Search Report dated Jun. 16, 2015 from International Patent Application No. PCT/CN2015/074174 filed Mar. 13, 2015.
International Search Report dated Jul. 2, 2015 from International Patent Application No. PCT/CN2015/075076 filed Mar. 26, 2015.

*Primary Examiner* — Vinncelas Louis
(74) *Attorney, Agent, or Firm* — Stevens & Showalter, LLP

(57) ABSTRACT

The present invention provides a UE, a method for an aperiodic SRS in a base station and a device. For a problem of a scheduling restriction of a traditional A-SRS in unlicensed spectrum communication, the present disclosure provides the method and apparatus for the A-SRS, wherein physical-layer signaling is used to indicate a sending frequency band of an SRS to implement flexible scheduling of the aperiodic SRS. As an embodiment, the number of
(Continued)

antenna ports of the A-SRS is configured by high-layer signaling identified by a logical cell index. A physical resource occupied by the aperiodic SRS is configured by high-layer signaling identified by a carrier index. The logical cell index at different frameworks may correspond to different physical carriers.

14 Claims, 4 Drawing Sheets

(51) Int. Cl.
*H04W 72/04* (2009.01)
*H04W 88/08* (2009.01)

(52) U.S. Cl.
CPC ........ *H04L 5/0094* (2013.01); *H04L 41/0803* (2013.01); *H04W 72/042* (2013.01); *H04W 72/0453* (2013.01); *H04L 5/001* (2013.01); *H04W 88/08* (2013.01)

(56) References Cited

U.S. PATENT DOCUMENTS

| | | | |
|---|---|---|---|
| 2012/0264468 | A1 | 10/2012 | Turtinen et al. |
| 2012/0281594 | A1 | 11/2012 | Stewart et al. |
| 2014/0036818 | A1 | 2/2014 | Koskela |
| 2016/0212731 | A1* | 7/2016 | Zhang ................... H04L 5/0092 |

FOREIGN PATENT DOCUMENTS

| | | |
|---|---|---|
| CN | 102934382 A | 2/2013 |
| CN | 103188711 A | 7/2013 |
| CN | 103517456 A | 1/2014 |
| CN | 103580840 A | 2/2014 |
| CN | 103609186 A | 2/2014 |
| CN | 103621130 A | 3/2014 |
| WO | 2011144803 A1 | 11/2011 |
| WO | 2013131268 A1 | 9/2013 |

* cited by examiner

| configuration index | frequency band |
|---|---|
| 1 | frequency band of first carrier combination |
| 2 | frequency band of second carrier combination |
| 3 | frequency band of third carrier combination |

| configuration index | frequency band | SRS information |
|---|---|---|
| 1 | frequency band of first carrier combination | first SRS information |
| 2 | frequency band of second carrier combination | second SRS information |
| 3 | frequency band of third carrier combination | third SRS information |
| 4 | frequency band of fourth carrier combination | fourth SRS information |
| 5 | frequency band of first carrier combination | fifth SRS information |
| 6 | frequency band of second carrier combination | sixth SRS information |
| 7 | frequency band of third carrier combination | seventh SRS information |

FIG. 5

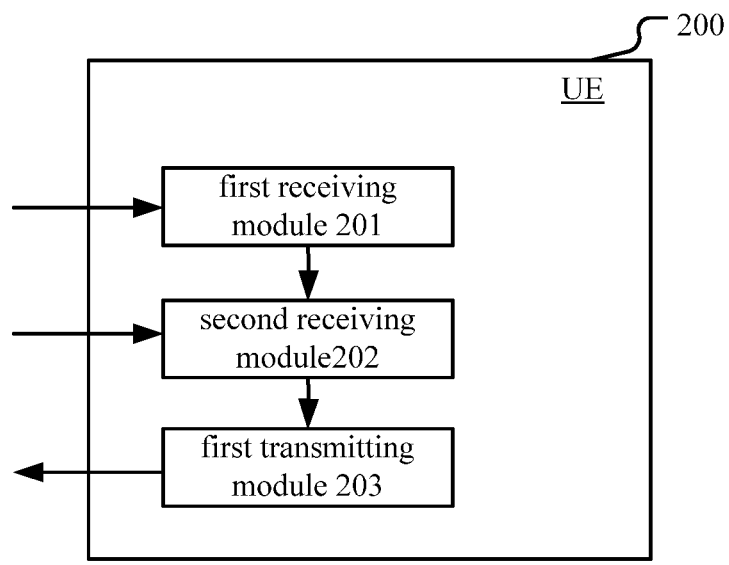

FIG. 6

METHOD AND DEVICE FOR APERIODIC SRS IN UE AND DEVICE BASE STATION

CROSS-REFERENCE TO RELATED APPLICATION

This application is a U.S. National Phase application under 35 U.S.C. § 371 of International Application No. PCT/CN2015/075076 filed on Mar. 26, 2015, and claims benefit to Chinese Patent Application No. CN 20140120411.4, filed on Mar. 27, 2014, all of which is hereby incorporated by reference for all purposes. The International Application was published in China on Oct. 17, 2015 as WO2015144062 A1 under PCT Article 21 (2).

BACKGROUND

Technical Field

The present disclosure is related to an unlicensed spectrum communication scheme applied in the wireless communication system, and more particular to a method and device for communication on an unlicensed spectrum based on Long Term Evolution (LTE).

Related Art

In the LTE system, the base station may transmit a downlink control indicator (DCI) to trigger an aperiodic sounding reference signal (A-SRS). The DCI format {0, 1A, 2B, 2C, 2D, 4} supports and triggers the A-SRS. For the UE, if a first DCI triggering the A-SRS is received, the SRS is transmitted on an uplink physical resource of a serving cell scheduled by the first DCI.

The serving cell includes a downlink carrier (or sub frame) and an uplink carrier (or sub frame). A cell index of the serving cell, a frequency band (or sub frame) of the downlink carrier and a frequency band (or sub frame) of the uplink carrier are semi-statically configured by a higher layer signaling.

In the traditional LTE system of the 3rd Generation Partner Project (3GPP), the data transmission only occurs on the licensed spectrum; however, with the sharp increase on the communication amount, especially in some urban areas, the licensed spectrum may be difficult to meet the demand of the communication amount. A new research topic is discussed in the 62th 3GPP RAN plenary, i.e. the comprehensive research of the unlicensed spectrum (RP-132085). The main purpose is to research the non-standalone deployment of LTE on the unlicensed spectrum, wherein the so-called non-standalone means that the communication on the unlicensed spectrum is required to be associated with the serving cell on the licensed spectrum. An intuitive approach is to reuse the carrier aggregation (CA) in the existing system as much as possible, i.e. the serving cell deployed on the licensed spectrum serves as the primary component carrier (PCC), and the serving cell deployed on the unlicensed spectrum serves as the secondary component carrier (SCC). For the unlicensed spectrum, considering the interference level thereof may not be controlled/predicted, such that the UE may be configured with more carriers, and (in a given sub frame) a part of carriers is selected from the selectable carriers to be used to transmit the data through a dynamical frequency selection (DFS) manner at the same time.

In the communication of the unlicensed spectrum, a triggering mechanism of the traditional A-SRS may encounter the following problem.

The base station may not be dynamically triggered to transmit SRS on the non-scheduled serving cell (A-SRS is transmitted on the serving cell scheduled by the scheduled DCI thereof).

For the above problems, the present disclosure discloses a method and device for SRS scheduling on an unlicensed spectrum.

SUMMARY

The present disclosure discloses a method for an aperiodic SRS in a user equipment, wherein the method includes the following steps:

Step A: receiving a higher layer signaling, wherein the higher layer signaling includes L sets of configuration information, and one set of configuration information including a configuration index and a frequency band;

Step B: receiving a downlink signaling, and the downlink signaling includes a first index; and Step C: transmitting a target SRS on a frequency band of the first configuration information, wherein the first configuration information is one set of configuration information with the configuration index equal to the first index in the L sets of configuration information;

wherein the downlink signaling is a physical layer signaling, the frequency bands of the L sets of the configuration information are deployed on an unlicensed spectrum, the configuration indexes of the L sets of configuration information are unique, the configuration indexes are an integer, and the L is a positive integer.

The character of the above aspect is that the physical layer signaling is used to indicate a transmitting frequency band of the SRS, and the transmitting frequency band is configured by the higher layer signaling. The transmitting frequency band is not necessarily associated with the serving cell scheduled by the physical layer signaling. In an embodiment, the configuration index is a carrier index on the unlicensed spectrum. Considering the number of the available carriers on the unlicensed spectrum may be larger, for bit expense of the first index, in another embodiment, the configuration index is an index of the carrier index on the unlicensed spectrum in the current configured SRS carrier set.

In one embodiment, the higher layer signaling is a radio resource control (RRC) layer signaling.

In one embodiment, the frequency band includes a carrier center frequency and a carrier bandwidth. In another embodiment, the frequency band includes a down frequency and an up frequency.

The downlink signaling includes scheduling information, and a format of the scheduling information is one scheduling information format of the DCI formats {0, 1A, 2B, 2C, 2D, 4}. The scheduling information is the controlling information used to schedule the transmission of the physical layer data. In one embodiment of the scheduling information, the scheduling information includes resource configuration head, resource block (RB) configuration, modulation coding status (MCS), hybrid automatic repeat request (HARQ) process identifier, new data indicator (NDI), redundancy version (RV), antenna port information, transmission power control (TPC) of physical uplink control channel (PUCCH), downlink assignment index (DAI), etc.

The configuration information includes SRS configuration, the target SRS complies with the SRS configuration of the first configuration information, and the SRS configuration includes an antenna port number and an occupied physical resource. In one embodiment, if the configuration information includes the SRS configuration, the scheduling information format of the downlink signaling is a scheduling information format of the DCI format {0, 4}.

The step B further includes the following step:

Step B1: processing a physical layer data according to the downlink signaling;

wherein if the downlink signaling is a downlink scheduling signaling, the processing is receiving; if the downlink signal is an uplink scheduling signaling, the processing is transmitting.

The downlink scheduling information includes the DCI format {1A, 2B, 2C, 2D}, and the uplink scheduling signaling includes the DCI format {0, 4}.

In one embodiment, the downlink signaling includes a carrier index, and the physical layer data is transmitted on the carrier identified by the carrier index. In another embodiment, the downlink signaling is the downlink scheduling signaling, and the physical layer data is transmitted on the transport carrier of the downlink signaling.

The higher layer signaling includes logical information, and the logical information includes a logical cell index. The downlink signaling includes a virtual index, the virtual index equals to the logical cell index, and the logical cell index is a positive integer. The logical information includes logical SRS information, and the logical SRS information includes an antenna port number of the target SRS.

The target SRS complies with the logical SRS information. In one embodiment, the logical SRS information includes all or part of information of SRS-ConfigAp-r10. In one embodiment, the logical cell index is a positive integer from 1 to 7—using carrier indicator field (CIF) bits to indicate the carrier logical index and 0 is reserved for a primary cell deployed on a licensed spectrum.

The higher layer signaling includes the physical information, the physical information includes a carrier index and physical SRS information in the frequency band of the first configuration information, and the physical SRS information includes a physical resource occupied by the target SRS.

The target SRS complies with the physical SRS information. In one embodiment, the physical SRS information includes all or part of information of SRS-ConfigAp-r10. In one embodiment, the logical SRS information includes srs-AntennaPortAp-r10; the physical SRS information includes {srs-BandwidthAp-r10, freqDomainPositionAp-r10, transmissionCombAp-r10, cyclicShiftAp-r10}.

The configuration information is a positive integer. In one embodiment, if a value of the first index is 0, it is used to indicate that the target SRS is not transmitted.

The frequency band of the first configuration information is discrete on a frequency domain. In one embodiment, the frequency band of the first configuration information includes frequency bands of a plurality of carriers. That is, one DCI may trigger the transmission of SRS on the plurality of carriers.

The present disclosure discloses a method for an aperiodic SRS in a base station, wherein the method includes the following steps:

Step A: transmitting a higher layer signaling, wherein the higher layer signaling includes L sets of configuration information, and one set of configuration information including a configuration index and a frequency band;

Step B: transmitting a downlink signaling, and the downlink signaling includes a first index; and Step C: receiving a target SRS on a frequency band of the first configuration information, wherein the first configuration information is one set of configuration information with the configuration index equal to the first index in the L sets of configuration information;

wherein the downlink signaling is a physical layer signaling, the frequency bands of the L sets of the configuration information are deployed on an unlicensed spectrum, the configuration indexes of the L sets of configuration information are unique, the configuration indexes are an integer, and the L is a positive integer.

The step B further includes the following steps:

Step B1: processing a physical layer data according to the downlink signaling;

wherein if the downlink signaling is a downlink scheduling signaling, the processing is transmitting; if the downlink signal is an uplink scheduling signaling, the processing is receiving.

In one embodiment, the downlink signaling includes a carrier index, and the physical layer data is transmitted on the carrier identified by the carrier index.

In another embodiment, the downlink signaling is the downlink scheduling signaling, and the physical layer data is transmitted on the carrier transmitted by the downlink signaling.

The higher layer signaling includes logical information, and the logical information includes a logical cell index. The downlink signaling includes a virtual index, the virtual index equals to the logical cell index, and the logical cell index is a positive integer. The logical information includes logical SRS information, and the logical SRS information includes an antenna port number of the target SRS.

The target SRS complies with the logical SRS information, and the target CSI complies with the logical CSI information. In one embodiment, the logical SRS information includes all or part of information of SRS-ConfigAp-r10. In one embodiment, the logical cell index is a positive integer from 1 to 7.

The higher layer signaling includes the physical information, the physical information includes a carrier index and physical SRS information in the frequency band of the first configuration information, and the physical SRS information includes a physical resource occupied by the target SRS.

The frequency band of the first configuration information is discrete on a frequency domain. In one embodiment, the frequency band of the configuration information includes a plurality of carriers.

The downlink signaling includes scheduling information, and a format of the scheduling information is one scheduling information format of the DCI formats {0, 1A, 2B, 2C, 2D, 4}.

The configuration information is a positive integer. In one embodiment, if a value of the first index is 0, it is used to indicate that the target SRS is not transmitted.

The configuration information includes a SRS configuration, the target SRS complies with the SRS configuration of the first configuration information, and the SRS configuration includes an antenna port number and an occupied physical resource. In one embodiment, if the configuration information includes the SRS configuration, the scheduling information format of the downlink signaling is a scheduling information format of the DCI format 4.

The present disclosure discloses a user equipment, which includes:

a first module, for receiving a higher layer signaling, wherein the higher layer signaling includes L sets of configuration information, and one set of configuration information including a configuration index and a frequency band;

a second module, for receiving a downlink signaling, the downlink signaling includes a first index; and a third module, for transmitting a target SRS on a frequency band of the first configuration information, wherein the first configuration information is one set of configuration information with the configuration index equal to the first index in the L sets of configuration information;

wherein the downlink signaling is a physical layer signaling, the frequency bands of the L sets of the configuration information are deployed on an unlicensed spectrum, the configuration indexes of the L sets of configuration information are unique, the configuration indexes are an integer, and the L is a positive integer.

In one embodiment, the higher layer signaling further includes at least one of the following:

the logical information, and the logical information includes a logical cell index; the downlink signaling includes a virtual index, the virtual index equals to the logical cell index and the logical cell index is an integer; the logical information includes the logical SRS information, and the logical SRS information includes an antenna port number of the target SRS; and the physical information, and the physical information includes a carrier index and a physical SRS information in the frequency band of the first configuration information, and the physical SRS information includes a physical resource occupied by the target SRS.

The present disclosure discloses a base station equipment, which includes:

a first module, for transmitting a higher layer signaling, wherein the higher layer signaling includes L sets of configuration information, and one set of configuration information including a configuration index and a frequency band;

a second module, for transmitting a downlink signaling, the downlink signaling includes a first index; and a third module, for receiving a target SRS on a frequency band of the first configuration information, wherein the first configuration information is one set of configuration information with the configuration index equal to the first index in the L sets of configuration information;

wherein the downlink signaling is a physical layer signaling, the frequency bands of the L sets of the configuration information are deployed on an unlicensed spectrum, the configuration indexes of the L sets of configuration information are unique, the configuration indexes are an integer, and the L is a positive integer.

In one embodiment, the higher layer signaling further includes at least one of the following:

the logical information, and the logical information includes a logical cell index; the downlink signaling includes a virtual index, the virtual index equals to the logical cell index and the logical cell index is an integer; the logical information includes the logical SRS information, and the logical SRS information includes an antenna port number of the target SRS; and the physical information, and the physical information includes a carrier index and a physical SRS information in the frequency band of the first configuration information, and the physical SRS information includes a physical resource occupied by the target SRS.

For the problem of the scheduling restriction of a traditional A-SRS in an unlicensed spectrum communication, the present disclosure provides a method and a device for an aperiodic SRS, a physical layer signaling indicates a transmitting frequency band of SRS to implement a flexible scheduling of the aperiodic SRS. In one embodiment, a number of antenna ports of the aperiodic SRS is configured by the higher layer signaling identified by a logical cell index, a physical resource occupied by the aperiodic SRS is configured by the higher layer signaling identified by a carrier index, and one logical cell index may correspond to different physical carriers in different sub frames. In a scheme provided by the present disclosure, the base station may dynamically trigger transmitting of the SRS on a non-scheduled carrier, thereby meeting a requirement of a DFS technique on an uplink CSI in the unlicensed spectrum communication. In addition, the present disclosure reuses a DCI format in an existing LTE as much as possible and has good compatibility.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which:

FIG. 5 is another schematic diagram illustrating the configuration information according to one embodiment of the present disclosure;

FIG. 6 is a schematic structure diagram illustrating a user equipment according to one embodiment of the present disclosure.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
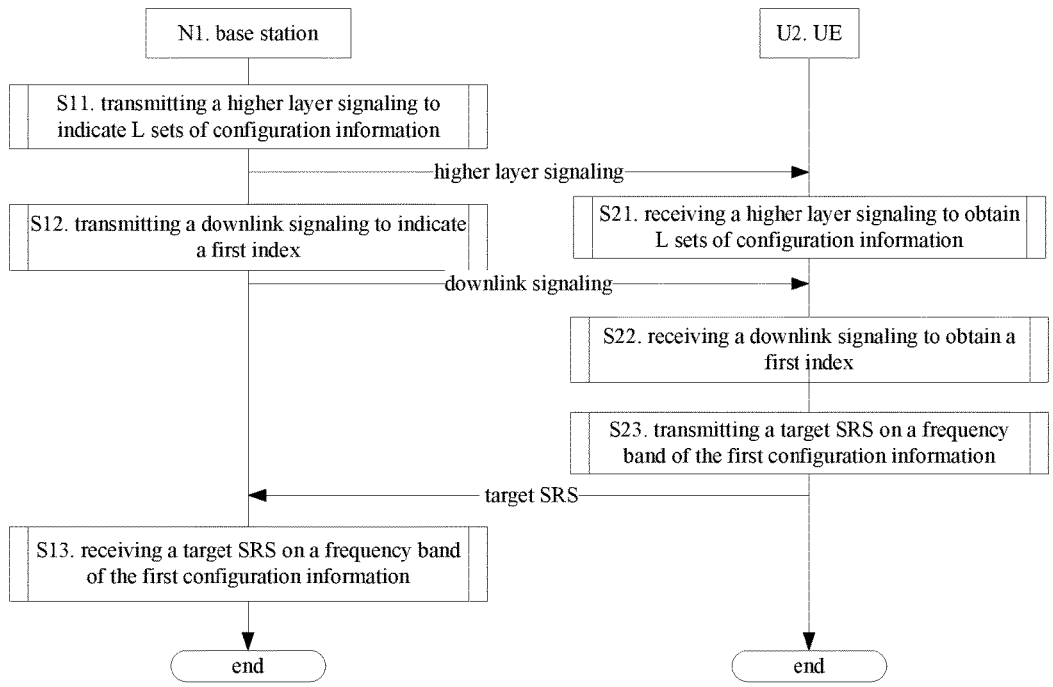
FIG. 1 is a flowchart of a method for dynamically scheduling SRS on an unlicensed spectrum according to one embodiment of the present disclosure.

Embodiment I illustrates a method for dynamically scheduling SRS on an unlicensed spectrum, as shown in FIG. 1. In FIG. 1, the base station N1 is a service base station for the user equipment (UE) U2.

For the base station N1, in step S11, the method involves transmitting a higher layer signaling, wherein the higher layer signaling includes L sets of configuration information, and one set of configuration information includes a configuration index and a frequency band; in step S12, the method involves transmitting a downlink signaling, and the downlink signaling includes a first index; in step S13, the method involves receiving a target SRS on a frequency band of the first configuration information, wherein the first configuration information is one set of configuration information with the configuration index equal to the first index in the L sets of configuration information.

For the UE U2, in step S21, the method involves receiving a higher layer signaling, wherein the higher layer signaling includes L sets of configuration information, and one set of configuration information includes a configuration index and a frequency band; in step S22, the method involves receiving a downlink signaling, and the downlink signaling includes a first index; in step S23, the method involves transmitting a target SRS on a frequency band of the first configuration information, wherein the first configuration information is one set of configuration information with the configuration index equal to the first index in the L sets of configuration information.

In Embodiment I, the downlink signaling is a physical layer signaling, the frequency bands of the L sets of the configuration information are deployed on an unlicensed spectrum, the configuration indexes of the L sets of configuration information are unique (i.e. different each other), the configuration indexes are an integer, and the L is a positive integer.

In a first exemplary embodiment of Embodiment I, the higher layer signaling includes logical information, and the logical information includes a logical cell index. The downlink signaling includes a virtual index, the virtual index equals to the logical cell index, and the logical cell index is a positive integer. The logical information includes logical SRS information, the logical SRS information includes all or part of information of SRS-ConfigAp-r10, and the target SRS obeys the configuration of the logical SRS information.

In a second exemplary embodiment of Embodiment I, the higher layer signaling includes physical information, the physical information includes a carrier index and physical SRS information in the frequency band of the first configuration information, the physical SRS information includes all or part of information of SRS-ConfigAp-r10, and the target SRS complies with the configuration of the physical SRS information.

In a third exemplary embodiment of Embodiment I, the higher layer signaling includes logical information and physical information, and the logical information includes a logical cell index. The downlink signaling includes a virtual index, the virtual index equals to the logical cell index, and the logical cell index is an integer from 1 to 7. The logical information includes logical SRS information, the logical SRS information includes an antenna port number of the target SRS. The physical information includes a carrier index and physical SRS information in the frequency band of the first configuration information, and the physical SRS information includes a physical resource occupied by the target SRS.

Embodiment II

Figure 2:
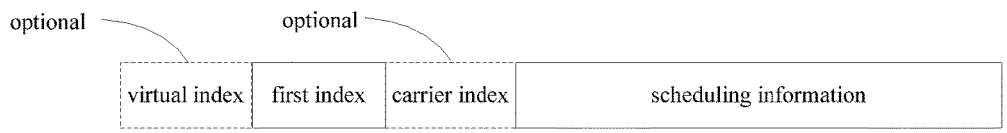
FIG. 2 is a schematic diagram illustrating a downlink signaling according to one embodiment of the present disclosure.

Embodiment II is a schematic diagram illustrating a downlink signaling, as shown in FIG. 2. In FIG. 2, the downlink signaling includes a virtual index, a first index, a carrier index and scheduling information, wherein the virtual index and the carrier are optional—indicated by a dotted line. FIG. 2 describes an information type included in the downlink signaling. Unless otherwise stated, FIG. 2 does not limit a position of the information type of the downlink signaling.

For the base station, firstly, a higher layer signaling is transmitted, wherein the higher layer signaling includes L sets of configuration information, and one set of configuration information includes a configuration index and a frequency band; a downlink signaling is transmitted, and the downlink signaling includes a first index; a target SRS is received on a frequency band of the first configuration information, wherein the first configuration information is one set of configuration information with the configuration index equal to the first index in the L sets of configuration information.

For the UE, firstly, a higher layer signaling is received, wherein the higher layer signaling includes L sets of configuration information, and one set of configuration information includes a configuration index and a frequency band; a downlink signaling is received, and the downlink signaling includes a first index; a target SRS is transmitted on a frequency band of the first configuration information, wherein the first configuration information is one set of configuration information with the configuration index equal to the first index in the L sets of configuration information.

In Embodiment II, the downlink signaling is a physical layer signaling, the frequency bands of the L sets of the configuration information are deployed on an unlicensed spectrum, the configuration indexes of the L sets of configuration information are unique, the configuration indexes are an integer, and the L is a positive integer.

In a first exemplary embodiment of Embodiment II, the downlink signaling includes scheduling information, and a format of the scheduling information is one scheduling information format of the DCI formats {0, 1A, 2B, 2C, 2D, 4}.

In a second exemplary embodiment of Embodiment II, the downlink signaling includes a carrier index, and the carrier index indicates the carrier scheduled by the scheduling information. Considering a number of the carriers on the unlicensed spectrum may be larger, the carrier index may be more than three bits.

In a third exemplary embodiment of Embodiment II, the downlink signaling includes a virtual index, and the virtual index reuses carrier indicator field (CIF) bits of the DCI. The higher layer signaling includes logical information, and the logical information includes a logical cell index. The virtual index equals to the logical cell index, and the logical cell index is a positive integer. The logical information includes logical SRS information, and the logical SRS information includes an antenna port number of the target SRS.

Embodiment III

Figures 3, 4:
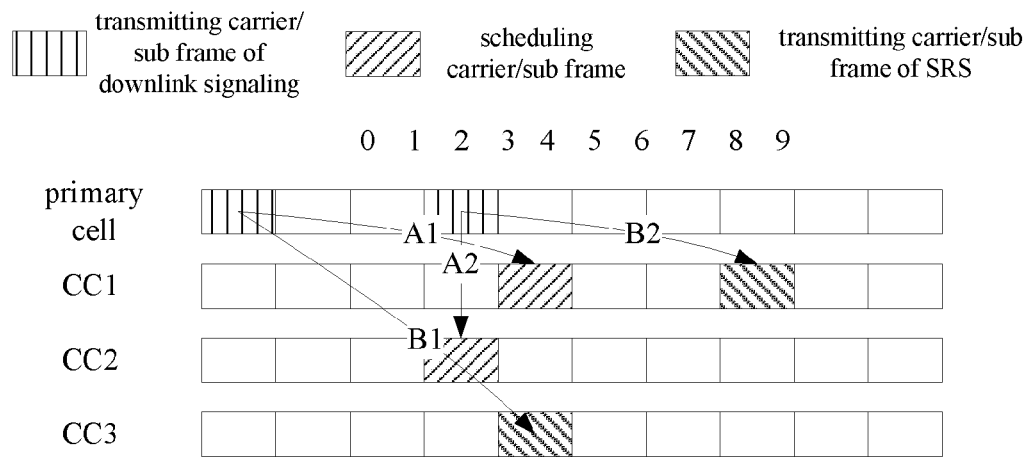
FIG. 3 is a flowchart of a method for dynamically scheduling SRS on a plurality of carriers according to one embodiment of the present disclosure.
FIG. 4 is a schematic diagram illustrating configuration information according to one embodiment of the present disclosure.

Embodiment III is flowchart of a method for dynamically scheduling SRS on a plurality of carriers, as shown in FIG. 3. In FIG. 3, a primary cell is deployed on the licensed spectrum, CC1-CC3 are deployed on the unlicensed spectrum, a square indicted by a vertical line is the transmitting carrier and the sub frame of the downlink signaling, a square indicated by a slash is the transmitting carrier and the sub frame of the physical layer data scheduled by the downlink signaling, and a square indicated by a backslash is the transmitting carrier and the sub frame of SRS scheduled by the downlink signaling.

For the base station, firstly, a higher layer signaling is transmitted, wherein the higher layer signaling includes L sets of configuration information, and one set of configuration information includes a configuration index and a frequency band; a downlink signaling is transmitted, and the downlink signaling includes a first index; a physical layer data is processed according to the downlink signaling, wherein if the downlink signaling is a downlink scheduling signaling, the processing is transmitting; if the downlink signal is an uplink scheduling signaling, the processing is receiving; a target SRS is received on a frequency band of the first configuration information, wherein the first configuration information is one set of configuration information with the configuration index equal to the first index in the L sets of configuration information.

For the UE, firstly, a higher layer signaling is received, wherein the higher layer signaling includes L sets of configuration information, and one set of configuration information includes a configuration index and a frequency band; a downlink signaling is received, and the downlink signaling includes a first index; a physical layer data is processed according to the downlink signaling, wherein if the downlink signaling is a downlink scheduling signaling, the processing is receiving; if the downlink signal is an uplink scheduling signaling, the processing is transmitting; a target SRS is transmitted on a frequency band of the first configuration information, wherein the first configuration information is one set of configuration information with the configuration index equal to the first index in the L sets of configuration information.

In Embodiment III, the downlink signaling is a physical layer signaling, the frequency bands of the L sets of the configuration information are deployed on an unlicensed spectrum, the configuration indexes of the L sets of configuration information are unique, the configuration indexes are an integer, and the L is a positive integer.

In a first exemplary embodiment of Embodiment III, the frequency band of the first configuration information is the frequency band of CC3, the downlink signaling includes a carrier index, and the carrier index equals to the index of CC1. The downlink signaling is transmitted on the sub frame #0 of the primary cell, the downlink signaling is the uplink scheduling signaling, the physical layer data is transmitted on the sub frame #4 of CC1 indicated by the carrier index (indicated by an arrow A1), and the target SRS is transmitted on the sub frame #4 of CC3 indicated by the first configuration information (indicated by an arrow B1).

In a second exemplary embodiment of Embodiment III, the frequency band of the first configuration information is the frequency band of CC1, the downlink signaling includes a carrier index, and the carrier index equals to the index of CC2. The downlink signaling is transmitted on the sub frame #3 of the primary cell, the downlink signaling is the downlink scheduling signaling, the physical layer data is transmitted on the sub frame #3 of CC2 indicated by the carrier index (indicated by an arrow A2), and the target SRS is transmitted on the sub frame #7 of CC1 indicated by the first configuration information (indicated by an arrow B2).

Embodiment IV

Embodiment IV is a schematic diagram illustrating configuration information, as shown in FIG. 4. In FIG. 4, there are three sets of configuration information, and a frequency band of each of three sets of configuration information includes a frequency band of one carrier combination.

For the base station, firstly, a higher layer signaling is transmitted, the higher layer signaling includes three sets of configuration information, and one set of configuration information includes a configuration index and a frequency band; a downlink signaling is transmitted, and the downlink signaling includes a first index; a physical layer data is processed according to the downlink signaling, wherein if the downlink signaling is a downlink scheduling signaling, the processing is transmitting; if the downlink signal is an uplink scheduling signaling, the processing is receiving; a target SRS is received on a frequency band of the first configuration information.

For the UE, firstly, a higher layer signaling is received, wherein the higher layer signaling includes three sets of configuration information, and one set of configuration information including a configuration index and a frequency band; a downlink signaling is received, and the downlink signaling includes a first index; a physical layer data is processed according to the downlink signaling, wherein if the downlink signaling is a downlink scheduling signaling, the processing is receiving; if the downlink signal is an uplink scheduling signaling, the processing is transmitting; a target SRS is transmitted on a frequency band of the first configuration information.

In Embodiment IV, the downlink signaling is a physical layer signaling, the frequency bands of the three sets of the configuration information are deployed on an unlicensed spectrum. If the first index of the downlink signaling is '01', the first configuration information is the configuration information with the configuration index equal to 1 in the three sets of configuration information; if the first index of the downlink signaling is '10', the first configuration information is the configuration information with the configuration index equal to 2 in the three sets of configuration information; if the first index of the downlink signaling is '11', the first configuration information is the configuration information with the configuration index equal to 3 in the three sets of configuration information.

In a first exemplary embodiment of Embodiment IV, the carrier combination only includes one carrier.

In a second exemplary embodiment of Embodiment IV, the carrier combination may include more than one carrier, i.e. the frequency band of the corresponding configuration information is discrete on a frequency domain.

In a third exemplary embodiment of Embodiment IV, a value of the first index is '00', it means that the SRS is not transmitted.

Embodiment V

Embodiment V is another schematic diagram illustrating the configuration information, as shown in FIG. 5. In FIG. 5, there are seven sets of configuration information, a frequency band of each of three sets of configuration information includes a frequency band of one carrier combination and one SRS configuration, and the SRS configuration includes an antenna port number and an occupied physical resource.

For the base station, firstly, a higher layer signaling is transmitted, wherein the higher layer signaling includes seven sets of configuration information; a downlink signaling is transmitted, and the downlink signaling includes a first index; a target SRS is received on a frequency band of the first configuration information, and the target SRS complies with the SRS configuration of the first configuration information.

For the UE, firstly, a higher layer signaling is received, wherein the higher layer signaling includes seven sets of configuration information; a downlink signaling is received, and the downlink signaling includes a first index; a target SRS is transmitted on a frequency band of the first configuration information, and the target SRS complies with the SRS configuration of the first configuration information.

In the Embodiment V, the downlink signaling is a physical layer signaling, the frequency bands of the seven sets of the configuration information are deployed on an unlicensed spectrum. The first configuration information is one set of configuration information with the configuration index equal to the first index in the seven sets of configuration information, and the first index includes three bits.

Embodiment VI

Embodiment V is a structure schematic diagram illustrating a user equipment, as shown in FIG. 6. In FIG. 6, the user equipment 200 mainly includes a first receiving module 201, a second receiving module 202 and a first transmitting module 203.

The first receiving module 201 is used for receiving a higher layer signaling, wherein the higher layer signaling includes L sets of configuration information, and one set of configuration information includes a configuration index and a frequency band. The second receiving module 202 is used for receiving a downlink signaling, and the downlink signaling includes a first index. The first transmitting module 203 is used for transmitting a target SRS on a frequency band of the first configuration information, wherein the first configuration information is one set of configuration information with the configuration index equal to the first index in the L sets of configuration information.

In Embodiment VI, the downlink signaling is a physical layer signaling, the frequency bands of the L sets of the configuration information are deployed on an unlicensed spectrum, the configuration indexes of the L sets of configuration information are unique, the configuration indexes are an integer, and the L is a positive integer.

In one exemplary embodiment of Embodiment VI, the higher layer signaling further includes at least one of the following:

the logical information, and the logical information includes a logical cell index; the downlink signaling includes a virtual index, the virtual index equals to the logical cell index and the logical cell index is an integer; the logical information includes the logical SRS information, and the logical SRS information includes an antenna port number of the target SRS; and the physical information, and the physical information includes a carrier index and a physical SRS information in the frequency band of the first configuration information, and the physical SRS information includes a physical resource occupied by the target SRS.

In another exemplary embodiment of Embodiment VI, the downlink signaling includes scheduling information, and a format of the scheduling information is one scheduling information format of the DCI formats {0, 1A, 2B, 2C, 2D, 4}.

Embodiment VII

Figure 7:
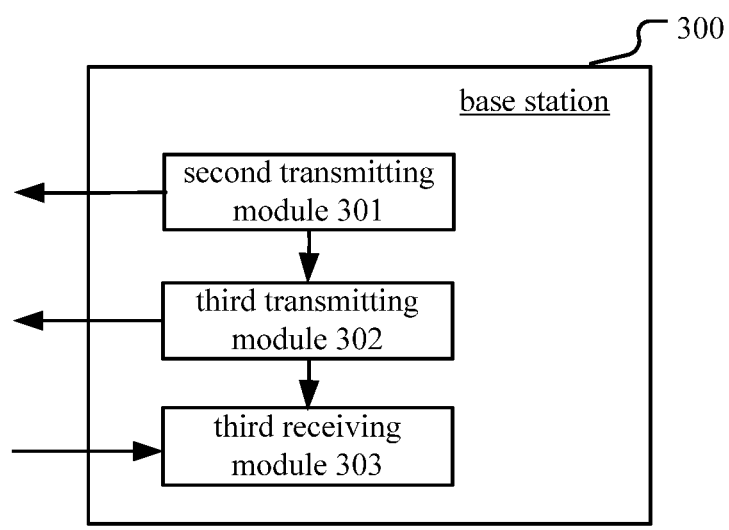
FIG. 7 is a schematic structure diagram illustrating a base station equipment according to one embodiment of the present disclosure.

Embodiment VII is a structure schematic diagram illustrating a base station, as shown in FIG. 7. In FIG. 7, the base station 300 mainly includes a second transmitting module 301, a third transmitting module 302 and a third receiving module 303.

The second transmitting module 301 is used for transmitting a higher layer signaling, wherein the higher layer signaling includes L sets of configuration information, and one set of configuration information includes a configuration index and a frequency band. The third transmitting module 302 is used for transmitting a downlink signaling, the downlink signaling includes a first index. The third receiving module 303 is used for receiving a target SRS on a frequency band of the first configuration information, wherein the first configuration information is one set of configuration information with the configuration index equal to the first index in the L sets of configuration information.

In Embodiment VII, the downlink signaling is a physical layer signaling, the frequency bands of the L sets of the configuration information are deployed on an unlicensed spectrum, the configuration indexes of the L sets of configuration information are unique, the configuration indexes are an integer, and the L is a positive integer.

In one exemplary embodiment of Embodiment VII, the higher layer signaling further includes at least one of the following:

the logical information, and the logical information includes a logical cell index; the downlink signaling includes a virtual index, the virtual index equals to the logical cell index and the logical cell index is an integer; the logical information includes the logical SRS information, and the logical SRS information includes an antenna port number of the target SRS; and the physical information, and the physical information includes a carrier index and a physical SRS information in the frequency band of the first configuration information, and the physical SRS information includes a physical resource occupied by the target SRS.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method for an aperiodic sounding reference signal (SRS) in a user equipment, comprising the following steps:
    Step A: receiving, by the user equipment, a higher layer signaling, wherein the higher layer signaling comprises L sets of configuration information, and one set of the L sets of configuration information comprising a configuration index and a frequency band;
    Step B: receiving a downlink signaling, and the downlink signaling comprises a first index; and
    Step C: transmitting a target SRS on a frequency band of a first configuration information, wherein the first configuration information is the one set of the L sets of configuration information with the configuration index equal to the first index in the L sets of configuration information;
    wherein the downlink signaling is a physical layer signaling, frequency bands of the L sets of the configuration information are deployed on an unlicensed spectrum, configuration indexes of the L sets of configuration information are unique, configuration indexes are an integer, and the L is a positive integer.

2. The method for the aperiodic SRS in the user equipment according to claim 1, wherein the step B further comprises:
    Step B1: processing a physical layer data according to the downlink signaling;
    wherein if the downlink signaling is a downlink scheduling signaling, the processing is receiving; if the downlink signal is an uplink scheduling signaling, the processing is transmitting.

3. The method for the aperiodic SRS in the user equipment according to claim 1, further comprising at least one of the below:

the higher layer signaling comprises logical information, and the logical information comprises a logical cell index; the downlink signaling comprises a virtual index, the virtual index equals to the logical cell index, and the logical cell index is a positive integer; the logical information comprises logical SRS information, and the logical SRS information comprises an antenna port number of the target SRS; and the higher layer signaling comprises physical information, the physical information comprises a carrier index and physical SRS information in the frequency band of the first configuration information, and the physical SRS information comprises a physical resource occupied by the target SRS.

4. The method for the aperiodic SRS in the user equipment according to claim 1, wherein the frequency band of the first configuration information is discrete on a frequency domain; or the downlink signaling comprises scheduling information, and a format of the scheduling information is one scheduling information format of the downlink control indicator (DCI) formats {0, 1A, 2B, 2C, 2D, 4}; or the configuration index is a positive integer.

5. The method for the aperiodic SRS in the user equipment according to claim 1, wherein the configuration information comprises a SRS configuration, the target SRS complies with the SRS configuration of the first configuration information, and the SRS configuration comprises an antenna port number and an occupied physical resource.

6. A method for an aperiodic sounding reference signal (SRS) in a base station, comprising the following steps:
Step A: transmitting, by the base station, a higher layer signaling, wherein the higher layer signaling comprises L sets of configuration information, and one set of the L sets of configuration information comprising a configuration index and a frequency band;
Step B: transmitting a downlink signaling, and the downlink signaling comprises a first index; and
Step C: receiving a target SRS on a frequency band of a first configuration information, wherein the first configuration information is the one set of the L sets of configuration information with the configuration index equal to the first index in the L sets of configuration information;
wherein the downlink signaling is a physical layer signaling, frequency bands of the L sets of the configuration information are deployed on an unlicensed spectrum, configuration indexes of the L sets of configuration information are unique, the configuration indexes are an integer, and the L is a positive integer.

7. The method for the aperiodic SRS in the base station according to claim 6, wherein the step B further comprises:
Step B1: processing a physical layer data according to the downlink signaling;
wherein if the downlink signaling is a downlink scheduling signaling, the processing is transmitting; if the downlink signal is an uplink scheduling signaling, the processing is receiving.

8. The method for the aperiodic SRS in the base station according to claim 6, further comprising at least one of the below:
the higher layer signaling comprises the logical information, and the logical information comprises a logical cell index; the downlink signaling comprises a virtual index, the virtual index equals to the logical cell index and the logical cell index is an integer; the logical information comprises the logical SRS information, and the logical SRS information comprises an antenna port number of the target SRS; and the higher layer signaling comprises the physical information, and the physical information comprises a carrier index and a physical SRS information in the frequency band of the first configuration information, and the physical SRS information comprises a physical resource occupied by the target SRS.

9. The method for the aperiodic SRS in the base station according to claim 6, wherein the frequency band of the first configuration information is discrete on a frequency domain; or the downlink signaling comprises scheduling information, and a format of the scheduling information is one scheduling information format of the downlink control indicator (DCI) formats {0, 1A, 2B, 2C, 2D, 4}; or the configuration index is a positive integer.

10. The method for the aperiodic SRS in the base station according to claim 6, wherein the configuration information comprises a SRS configuration, the target SRS complies with the SRS configuration of the first configuration information, and the SRS configuration comprises an antenna port number and an occupied physical resource.

11. A user equipment, comprising:
a processor and a memory storing program instructions, wherein the processor executes the program instructions stored in memory to:
receive a higher layer signaling, wherein the higher layer signaling comprises L sets of configuration information, and one set of the L sets of configuration information comprising a configuration index and a frequency band;
receive a downlink signaling, and the downlink signaling comprises a first index; and
transmit a sounding reference signal (SRS) on a frequency band of a first configuration information, wherein the first configuration information is the one set of the L sets of configuration information with the configuration index equal to the first index in the L sets of configuration information;
wherein the downlink signaling is a physical layer signaling, frequency bands of the L sets of the configuration information are deployed on an unlicensed spectrum, configuration indexes of the L sets of configuration information are independent, the configuration indexes are an integer, and the L is a positive integer.

12. The user equipment according to claim 11, wherein the higher layer signaling further comprises at least one of the following:
the logical information, and the logical information comprises a logical cell index; the downlink signaling comprises a virtual index, the virtual index equals to the logical cell index and the logical cell index is an integer; the logical information comprises the logical SRS information, and the logical SRS information comprises an antenna port number of the target SRS; and the physical information, and the physical information comprises a carrier index and a physical SRS information in the frequency band of the first configuration information, and the physical SRS information comprises a physical resource occupied by the target SRS.

13. A base station equipment, comprising:
a processor and a memory storing program instructions, wherein the processor executes the program instructions stored in memory to:

transmit a higher layer signaling, wherein the higher layer signaling comprises L sets of configuration information, and one set of the L sets of configuration information comprising a configuration index and a frequency band;

transmit a downlink signaling, and the downlink signaling comprises a first index; and receive a target sounding reference signal (SRS) on a frequency band of a first configuration information, wherein the first configuration information is the one set of the L sets of configuration information with the configuration index equal to the first index in the L sets of configuration information;

wherein the downlink signaling is a physical layer signaling, frequency bands of the L sets of the configuration information are deployed on an unlicensed spectrum, configuration indexes of the L sets of configuration information are independent, the configuration indexes are an integer, and the L is a positive integer.

14. The base station equipment according to claim 13, wherein the higher layer signaling further comprises at least one of the following:

the logical information, and the logical information comprises a logical cell index; the downlink signaling comprises a virtual index, the virtual index equals to the logical cell index and the logical cell index is an integer; the logical information comprises the logical SRS information, and the logical SRS information comprises an antenna port number of the target SRS; and the physical information, and the physical information comprises a carrier index and a physical SRS information in the frequency band of the first configuration information, and the physical SRS information comprises a physical resource occupied by the target SRS.

* * * * *